(12) United States Patent
Le Floch et al.

(10) Patent No.: US 9,258,347 B2
(45) Date of Patent: Feb. 9, 2016

(54) ENCODING OF A VIDEO FRAME FOR TRANSMISSION TO A PLURALITY OF CLIENTS

(75) Inventors: Hervé Le Floch, Rennes (FR); Frédéric Maze, Langan (FR)

(73) Assignee: Canon Kabushiki Kaisha, Tokyo (JP)

(*) Notice: Subject to any disclaimer, the term of this patent is extended or adjusted under 35 U.S.C. 154(b) by 644 days.

(21) Appl. No.: 13/164,580

(22) Filed: Jun. 20, 2011

(65) Prior Publication Data

US 2011/0310957 A1    Dec. 22, 2011

(30) Foreign Application Priority Data

Jun. 22, 2010 (GB) .................................. 1010479.2

(51) Int. Cl.
*H04N 7/50* (2006.01)
*H04L 29/06* (2006.01)
(Continued)

(52) U.S. Cl.
CPC .......... *H04L 65/602* (2013.01); *H04L 47/2416* (2013.01); *H04L 47/30* (2013.01); *H04L 47/38* (2013.01); *H04N 19/132* (2014.11); *H04N 19/146* (2014.11); *H04N 19/172* (2014.11); *H04N 19/59* (2014.11); *H04N 19/61* (2014.11); *H04N 21/2381* (2013.01); *H04N 21/2402* (2013.01); *H04N 21/6437* (2013.01)

(58) Field of Classification Search
CPC ..... H04L 47/2416; H04L 47/30; H04L 47/38; H04L 65/602; H04N 19/132; H04N 19/146; H04N 19/172; H04N 19/59; H04N 19/61; H04N 21/2381; H04N 21/2402; H04N 21/6437

USPC ................................. 370/252; 375/240; 257/3
See application file for complete search history.

(56) References Cited

U.S. PATENT DOCUMENTS 6,233,226 B1 * 5/2001 Gringeri et al. ............... 370/252
6,728,263 B2 * 4/2004 Joy et al. ....................... 370/468
(Continued)

FOREIGN PATENT DOCUMENTS

WO    2008/143493 A2    11/2008

OTHER PUBLICATIONS

Rizzo, Luigi "pgmcc: a TCP-friendly single-rate multicast congestion control scheme". (Oct. 2000) Proc. ACM SIGCOMM.*
(Continued)

*Primary Examiner* — Sath V Perungavoor
*Assistant Examiner* — Nathnael Aynalem
(74) *Attorney, Agent, or Firm* — Canon USA, Inc., IP Division

(57) ABSTRACT

In a method of encoding a video frame to be transmitted to a plurality of clients over a plurality of network connections, a set of parameters is associated with each connection. The method comprises:
for each connection, determining a frame size that can be transported over the connection considering the associated set of parameters; and
compressing the video frame to a target frame size based on the minimum of the plurality of determined frame sizes.
This method advantageously provides an easy and straightforward way for selecting the appropriate parameters that need to be taken into account for controlling the rate of the generated bitstream, particularly when multiple parameters are associated with each connection.

7 Claims, 3 Drawing Sheets

(51) Int. Cl.
*H04L 12/853* (2013.01)
*H04L 12/835* (2013.01)
*H04L 12/811* (2013.01)
*H04N 21/2381* (2011.01)
*H04N 21/24* (2011.01)
*H04N 21/6437* (2011.01)
*H04N 19/172* (2014.01)
*H04N 19/61* (2014.01)
*H04N 19/132* (2014.01)
*H04N 19/146* (2014.01)
*H04N 19/59* (2014.01)

(56) References Cited

U.S. PATENT DOCUMENTS

| | | | | |
|---|---|---|---|---|
| 7,154,951 | B2 * | 12/2006 | Wang | 375/240.12 |
| 7,356,079 | B2 * | 4/2008 | Laksono et al. | 375/240.03 |
| 7,782,939 | B2 * | 8/2010 | Martins et al. | 375/240.03 |
| 8,428,127 | B2 * | 4/2013 | Nie et al. | 375/240.12 |
| 8,477,844 | B2 * | 7/2013 | Zhou et al. | 375/240.03 |
| 2007/0053428 | A1 * | 3/2007 | Saleem et al. | 375/240 |
| 2007/0067480 | A1 * | 3/2007 | Beek et al. | 709/231 |
| 2008/0080379 | A1 * | 4/2008 | Chen | 370/235 |
| 2010/0306813 | A1 * | 12/2010 | Perry et al. | 725/114 |
| 2011/0032986 | A1 * | 2/2011 | Banger et al. | 375/240.07 |

OTHER PUBLICATIONS

Vieron, et al., "Delay-constrained TCP-compatible rate control for real-time video transmission over the Internet", Annales des telecommunications, France, Jan. 2002.

Widmer, et al., "Extending equation-based congestion control to multicast applications", Proceedings of SIGCOMM'2001, San Diego, California, Aug. 2001.

Johanson, "Scalable video conferencing using subband transform coding and layered multicast transmission", Proceedings of ICSPAT'99, Orlando, FL, Oct. 1999.

* cited by examiner

ENCODING OF A VIDEO FRAME FOR TRANSMISSION TO A PLURALITY OF CLIENTS

CROSS-REFERENCE TO RELATED APPLICATIONS

This application claims the benefit under 35 U.S.C. §119 (a)-(d) of United Kingdom Patent Application No. 1010479.2, filed on Jun. 22, 2010 and entitled "Encoding of a video frame for transmission to a plurality of clients".

The above cited patent application is incorporated herein by reference in its entirety.

BACKGROUND OF THE INVENTION

1. Field of the Invention

The present invention relates to encoders for encoding video data such as video streams of the MPEG type. In particular, the present invention relates to encoders that are adapted for delivering the same encoded video stream to a plurality of clients.

2. Description of the Related Art

FIG. 1 is a schematic diagram of a conventional system that allows the delivery of a video stream from a server device 100 to a receiving device 110 referred to as a client. The video stream, obtained from an external source such as a camcoder or from a storage memory, is composed of a plurality of (uncoded) frames. A frame represents typically one image, but it can also represent only part of an image or a plurality of images.

The server 100 includes an encoder 101 that encodes video frames, a packetizer 102 that packetizes the encoded video frames (bitstream) into data packets adapted to the transport protocol in use in the communication network 120 (for example the data packets may represent payload data of "Real-Time Protocol" or RTP packets, headers of the RTP packets will be added just before the sending on the network 120), a transmission buffer 103 for serving those data packets and a packet scheduler 104 in charge of scheduling the sending of the data packets over the network considering the available bandwidth.

The server 100 furthermore includes a network monitor module 106 that estimates the network characteristics based on end-to-end measurements and provides feedbacks to the packet scheduler module 104 and to a frame layer rate controller 105 for properly adjusting the packet sending rate. The network monitor 106 can measure the round-trip time (RTT) or the relative one-way trip time (RoTT) which represents the necessary time for a packet to reach the client after being sent by the server. Also, the network monitor 106 can implement for example the known TCP Friendly Rate Control algorithm (TFRC) that makes it possible to estimate the available bandwidth B(t) between the server and the client from measured round-trip time (RTT) and loss rate. Another example of an algorithm that can be implemented is the Additive Increase—Multiplicative Decrease (AIMD) congestion control algorithm that enables to estimate the available bandwidth B(t) from the measured round-trip time (RTT) and the size of a congestion window.

The frame layer rate controller 105 aims at controlling the rate of the bitstream outputted from the video encoder 101, the objective being to meet the constraints imposed by the connection established between the server and the client. This control is performed on a frame by frame basis. For each new frame to encode, the frame layer rate controller 105 sets a target size S for the resulting encoded frame. The video encoder 101 adjusts accordingly its compression parameters so that the actual frame size of the encoded frame be as close as possible to the target size S.

A first constraint of the connection that is to be met is keeping the sending rate out of the server below the network capacity B(t) as estimated by the network monitor 106. The bandwidth B(t) fluctuates over the time and needs to be estimated at regular intervals.

Another constraint that is usually considered is to have a constant video quality over a predetermined number of frames. When the encoder 101 applies predictive compression using motion compensation according to one of the formats MPEG2, MPEG4 part 2 or H264, the encoded frames are of two types: predicted frames (either predicted from one reference frame called P-frames or predicted from two reference frames called B-frames) and non predicted frames (called Intra frames or I-frames). For these types of encoding, it may be sufficient to have a constant quality over only one group of pictures (GOP). The GOP is defined as a set of frames that contains only one I-frame, which is the first encoded frame of the set, and only P or B frames that refer directly or indirectly to that I-frame. A GOP size can be 12 or 20 frames.

Yet a further constraint that applies for real-time video streaming is to have a bounded transmission delay D between the server and the client to guarantee timely display of video frames at the client. This constraint is particularly important for low latency applications like video-conference applications that require typically a maximum delay of 250 ms between image capturing or compression at the server side and display at the client side.

It is known, for example from "*Delay-constrained TCP-compatible rate control for real-time video transmission over the Internet*" published in "*Annales des télécommunications*" on January 2002, to use a rate control algorithm for choosing the encoding size of each new frame by taking into account the transmission delay and the available bandwidth.

When the same video encoded bitstream is to be delivered to a plurality of clients instead of one given client, the setting of the target size by the frame layer rate control needs to take into account the constraints imposed by all the connections established between the server and the plurality of clients.

This is typically the case in a multi-unicast system where the server includes one encoder for encoding the video frames, one packetizer that packetizes the encoded video frames but as many transmission buffers, network monitors and packet schedulers as there are clients to be served. In such a system, the way the constraints imposed by the different connections are taken into account needs to be addressed.

In article entitled "*Extending Equation-based Congestion Control to Multicast Applications*" published in the Proceedings of SIGCOMM'2001, San Diego, Calif., on August 2001, a sender-driven congestion control protocol is described that extends the TFRC congestion control mechanism into multicast, referred to as TFMCC. In order to avoid the server from being flooded by feedbacks from all clients, one client is designated as the current limiting receiver (CLR). This client can send feedbacks (measured RTT, loss rate and estimated bandwidth) without any limitation, whereas other clients can send feedbacks only after a random delay if their estimated bandwidth is lower. The server echoes received feedbacks in the multicast group and the CLR changes if another client sends feedbacks showing a lower rate.

This proposed approach does not provide however satisfactory results because the congestion control algorithm is based on the most limiting client in terms of bandwidth.

Clients with high capacity connections are still served based on the capacity of the connection having the lower rate.

Another approach known in the prior art is the implementation of a video scalable encoder (cf. for example article "Scalable Video Conferencing using Sub-band transform Coding and Layered Multicast Transmission" Proceedings of ICSPAT'99, Orlando, Fla., October 1999). The usage of a scalable bitstream allows to adapt the sending rate to the capacity of the different connections. Scalable video encoding and the associated decoding are however more sophisticated and their implementation is more complex. They also require more processing power.

Therefore, there is a need to be able to provide a more efficient bandwidth utilization when serving a bitstream generated by one video encoder towards a plurality of clients over connections with different parameters, without having to implement complex encodings like scalable encoding.

SUMMARY OF THE INVENTION

In accordance with one aspect of the present invention there is provided a method of encoding a video frame to be transmitted to a plurality of clients over a plurality of network connections, wherein a set of parameters is associated with each connection. The method comprises the steps of:

for each connection, determining a frame size that can be transported over the connection considering the associated set of parameters; and compressing the video frame to a target frame size based on the minimum of the plurality of determined frame sizes.

This method advantageously provides an easy and straightforward way for selecting the appropriate parameters that need to be taken into account for controlling the rate of the generated bitstream, particularly when multiple parameters are associated with each connection. Shifting the basis of decision to frame size allows for the aggregation of multiple parameters and simplifies the comparison between different sets of parameters in order to determine the actual minimum target frame size.

In a preferred embodiment the target frame size equals the minimum of the of the plurality of determined frame sizes to optimize bandwidth usage. Alternatively, the target frame size can be less than the minimum which just allows the serving of all clients.

Advantageously, each determined frame size is the maximum acceptable frame size that can be transported over the corresponding connection. This leads to an optimal use of network capacity by ensuring the maximum video quality considering the constraints imposed by the different clients.

The frame size for a connection can be determined in dependence upon a measure of bandwidth of the connection concerned and a transmission buffer filling level. More particularly, the buffer filling level at the start and end of transmission of a group of pictures is taken into account in the determination.

The frame size for a connection can be furthermore determined in dependence upon a measure of end-to-end transmission time of said connection and a maximum acceptable delay between an operation (e.g. compression) on the frame prior to transmission and an operation (e.g. display) on the frame following reception by a client.

In accordance with another aspect of the present invention there is provided a server for encoding a video frame to be transmitted to a plurality of clients over a plurality of network connections, wherein a set of parameters is associated with each connection. The server comprises:

means for determining, for each connection, a frame size that can be transported over the connection considering the associated set of parameters; and an encoder for compressing the video frame to a target frame size based on the minimum of the plurality of determined frame sizes.

In accordance with another aspect of the present invention there is provided a computer program that, when run on a data-processing system, causes the data-processing system to perform the methods as briefly described above.

In accordance with another aspect of the present invention there is provided a carrier medium, such as an information storage device, that can be read by a data-processing system or a microprocessor, storing instructions of a computer program for the implementation of the method of encoding a video frame as briefly described above.

The particular characteristics and advantages of the server device, of the carrier medium and of the computer program product being similar to those of the method of encoding a video frame, they are not repeated here.

DETAILED DESCRIPTION

Figure 2:
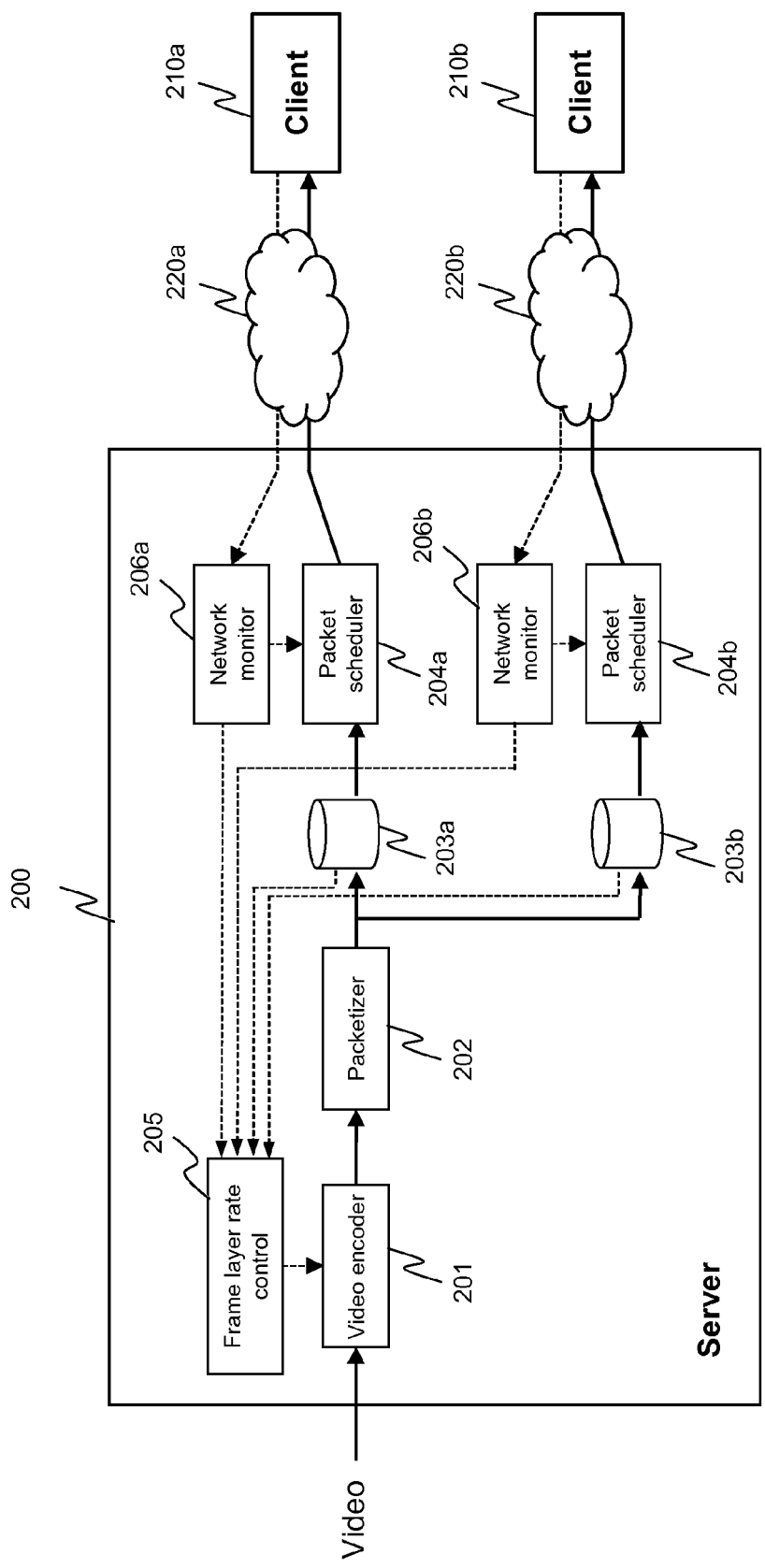
FIG. 2 depicts a schematic diagram of a system according to an embodiment of the invention that allows the delivery of a video stream from a server device to a plurality of clients.

FIG. 2 depicts a schematic diagram of a system that allows the delivery of a video stream from a server device 200 to a plurality of clients 210a, 210b. Only two clients are depicted as an example, but the invention applies for any number of clients.

Figure 1:
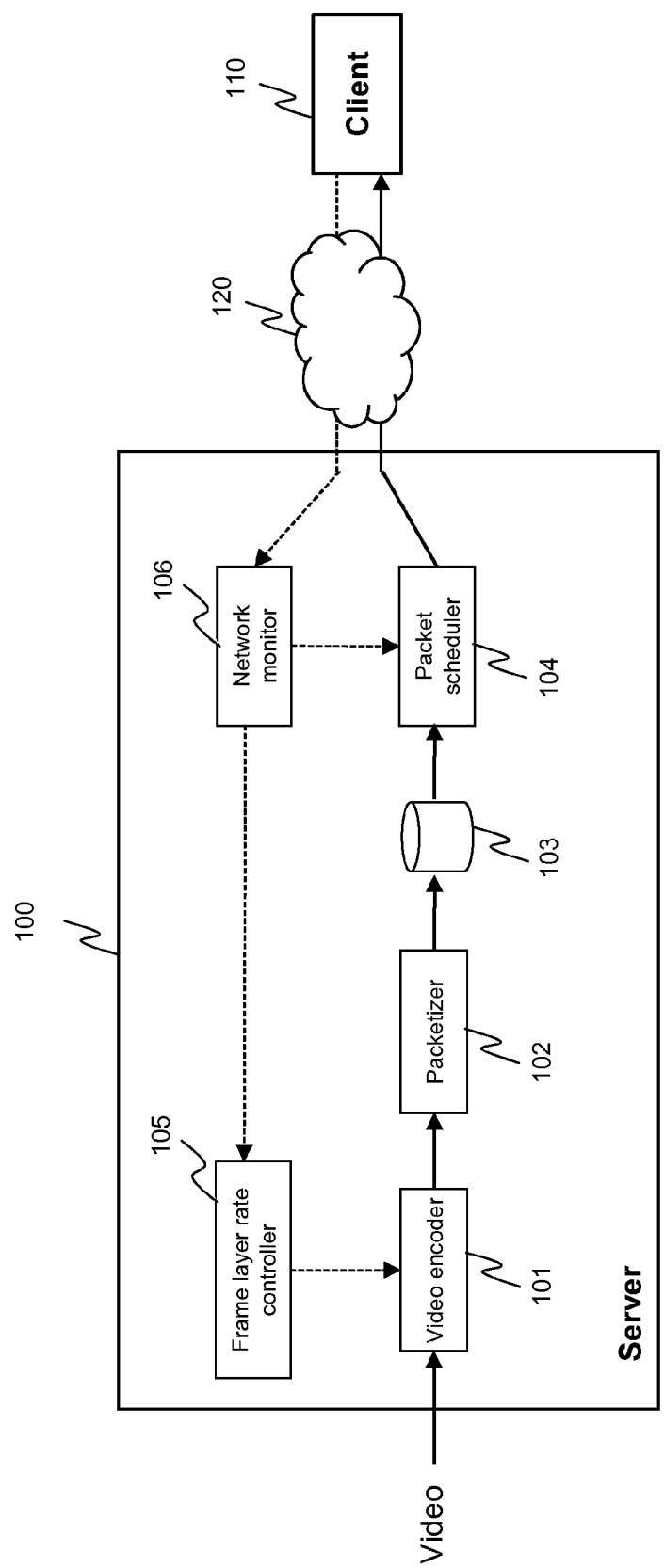
FIG. 1 depicts a schematic diagram of a conventional system that allows the delivery of a video stream from a server device to a client device.

Server device 200 comprises a frame layer rate controller 205 that is adapted to embody the invention. The server furthermore comprises a video encoder 201, a packetizer 202, buffers 203a, 203b, packet schedulers 204a, 204b and network monitors 206a, 206b that have all the same functions as those previously described with reference to FIG. 1. Thus, network monitors 206a and 206b deliver bandwidth estimations $B_a(t)$ and $B_b(t)$ and relative one-way trip time measurements $Rott_a$ and $Rott_b$ for the connections established from server 200 to respectively clients 210a and 210b, via sub-networks 220a and 220b.

Additionally, feedbacks are provided from each one of the transmission buffers 203a and 203b to the frame layer rate controller 205 for indicating the variation over time of their filling levels $Q_a(t)$ and $Q_b(t)$ respectively, as will be described in more detailed hereinafter.

Bandwidth estimation ($B_a(t)$, $B_b(t)$), relative one-way trip time ($Rott_a$, $Rott_b$) and buffer filling level ($Q_a(t)$, $Q_b(t)$) are examples of parameters that characterize a connection. Maximum acceptable delay ($D_a$, $D_b$) between the compression of a frame at the server and its display at a client is an additional parameter that can characterize a connection and is particularly relevant when delivering real-time video. This latter parameter can be predetermined for each connection. The frame layer rate controller 205 relies on such parameters associated with all the connections established between the server and the different clients for setting the target frame size with the final aim of meeting the transmission constraints.

Contrary to conventional methods, where the parameters that are delivered to the frame layer rate controller 205 are only those associated with the connection experiencing the least available bandwidth, in an embodiment of the present invention, the parameters associated with all the connections are communicated to the frame layer rate controller to enable it to take a decision regarding the target frame size.

Figure 3:
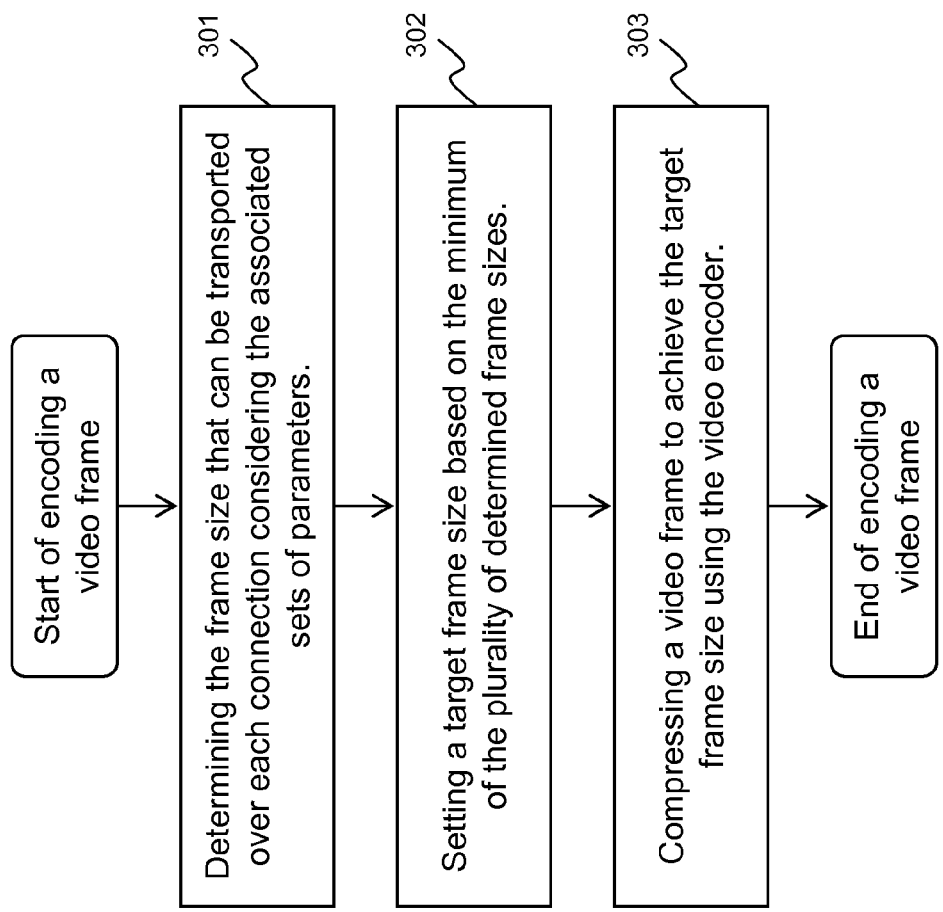
FIG. 3 depicts a flowchart illustrating the steps carried out for encoding a video frame according to an embodiment of the invention.

FIG. 3 depicts a flowchart illustrating the steps carried out for encoding a video frame according to an embodiment of the present invention.

In step 301, for each connection that is established to one of the plurality of clients 210a and 210b, a frame size that can be transported over said connection is determined. This determination takes into account the characteristics of such connection, as defined for example by the parameters ($B_a(t)$, $B_b(t)$), ($Rott_a$, $Rott_b$) and ($Q_a(t)$, $Q_b(t)$) previously described.

In a preferred embodiment, the determined frame size corresponds to the maximum acceptable frame size for the corresponding connection to take as much benefit as possible from the available network resources, such as bandwidth.

In a first example (example 1) this frame size can be determined based on the parameters $B_x(t)$ and $Q_x(t)$ where x equals either a or b. In this example, it is assumed that the encoder implements a predictive compression using motion compensation according to one of the formats MPEG2, MPEG4 part 2 or H264, and that a GOP contains (n−1) frames of type P only (P-frames) and one frame of type I (I-frame).

Firstly, in order to satisfy the constraint of maintaining a constant video quality over a GOP, and because the compression efficiency of a P-frame is higher, let's say by a factor C, than that of an I-frame, a common target size $S_P$ is set for all frames that are to be encoded as P-frames in the GOP and a target size $S_I = C \cdot S_P$ is set for the frame that is to be encoded as an I-frame.

Furthermore, it is assumed that at the start of a GOP transmission, the filling level of each transmission buffer 203a and 203b has a certain value $Q_0 = Q_x$ (t=start_of_GOP_transmission) which represents the quantity of data already present in the corresponding buffer, which needs to be transmitted before the sending of the data belonging to the GOP actually starts. More generally, it might be necessary for the proper operation of certain congestion control algorithms to keep a certain residual data in each buffer at the end of a GOP transmission. This residual filling level is represented by $Q_f = Q_x$(t=end_of_GOP_transmission). Of course, this value is simply set to zero if no residual data is required when computing the target frame size.

Considering the above, the quantity of data that needs to be sent during a GOP period is $Q_0 - Q_f + S_I + (n-1) S_P = Q_0 - Q_f + S_P (C+n-1)$. This needs to be kept below the network capacity. The latter can be expressed as B.n/f, where B is the available bandwidth $B_x(t)$ averaged over a GOP period given by n/f where f is the frame rate and n the number of frames per GOP. The inequality $Q_0 - Q_f + S_P(C+n-1) \leq B \cdot n/f$ also means that the quantity of information that leaves the buffer during a GOP period (n/f seconds) must be at least equal to the quantity of information that enters the buffer, provided that $Q_f \leq Q_0$. Consequently, the frame size for a P-frame should satisfy:

$$S_P \leq \frac{B \cdot n/f - (Q_0 - Q_f)}{C + n - 1}.$$

The target frame size for a P-frame can thus be set to $$\frac{B \cdot n/f - (Q_0 - Q_f)}{C + n - 1}$$

and for an I-frame to $$C \cdot \frac{B \cdot n/f - (Q_0 - Q_f)}{C + n - 1}.$$

Let's consider now a second example (example 2) that brings into play the parameters $Rott_x$ and $D_x$ where x equals either a or b. Recall that $D_x$ defines the maximum acceptable delay between the time of compressing a frame and the time of its display by a client 210a or 210b.

The transmission delay of an I-frame can be calculated as follows:

$$t = \frac{S_I + Q_0}{B} + Rott;$$

where B represents the available bandwidth for transmitting the I-frame. It is to be noted that B here may differ from the averaged bandwidth over a GOP as discussed above.

This transmission needs to be kept below the maximum acceptable delay, i.e.

$$\frac{S_I + Q_0}{B} + Rott < D_x,$$

from which it follows that a maximum target size for the I-frame should be equal to $B \cdot (D_x - Rott) - Q_0$.

It should be noted that further constraints for the P-frames can be added on a similar basis than for the I-frame. In other words, the transmission delay for a P-frame can be calculated as $$t = \frac{S_P + Q_0}{B} + Rott$$

and maximum target size for the P-frame as $B \cdot (D_x - Rott) - Q_0$; where B represents the available bandwidth for transmitting the P-frame. The constraint leading to the smallest maximum target size should be taken into account. It is likely however that the smallest one would be imposed by the constraint relating the I-frame because of its bigger size. It is assumed to be the case here and numerical examples are given below by considering only the I-frame.

All the constraints given in the above two examples may be accumulated to set the final target frame size.

In step 302, a target frame size is set based on the minimum of the plurality of determined frame sizes. In a preferred embodiment, the target frame size is chosen equal to the minimum of the plurality of the determined frame sizes to optimize bandwidth usage. Alternatively, the target frame size can be less than the minimum which just allows the serving of all clients. It can also be greater than the minimum which means that a certain tolerance in the constraints is acceptable as for example a certain frame loss rate when the transmission rate goes above the network capacity. The minimum of the plurality of determined frames sizes serves then as an absolute reference for appropriately setting the target frame size.

The target frame size is then communicated to video encoder 201. During a step 303 of encoding (compressing) the video frame, the video encoder 201 uses the target frame size to set the appropriate compression rate.

The steps of determining 301 and setting 302 are carried out by the frame layer rate controller 205, whereas the step of compressing 303 is carried out by the video encoder 201.

An advantage of an embodiment of the present invention is to easily select the optimal parameters that need to be taken into account, particularly when multiple parameters are associated with each connection.

Numerical examples of the execution of the flowchart of FIG. 3 are now given based on the formulas detailed above. Two pairs of sets of parameters are provided, where each pair represent the sets of parameters that are associated with the connections towards the clients 210$a$ and 210$b$. It is assumed that these sets of parameters include all the same values of n=12, f=30, C=7, $D_x$=0.4 seconds and $Q_f$=0. The remaining parameters of the different sets are depicted in the table below.

|  | Example 1 | | Example 2 | |
| --- | --- | --- | --- | --- |
|  | Set #a | Set #b | Set #a | Set #b |
| B (Mb/s) | 40 | 35 | 40 | 35 |
| $Q_0$ (Mb) | 4 | 0 | 4 | 0 |
| Rott (sec.) | — | — | 0.25 | 0.1 |
| Target $S_I$ (Mb) | 4.66 | 5.44 | 2 (4.66) | 10.5 (5.44) |

Example 1 shows that even though the connection to which is associated the set #b of parameters has a lower capacity (35 Mb/s compared to 40 Mb/s), it is the set #a of parameters that should be taken as reference for compressing the video frame as it leads to the minimum target frame size (4.66 Mb) due to the quantity of data (4 Mb) initially present in the corresponding buffer.

In example 2, the target frame sizes 2 and 10.5 Mb are calculated by considering only the transmission delay. The target sizes 4.66 and 5.44 Mb are also to be considered for taking into account the other constraints (cf. example 1). In any case, the minimum target frame size for the I-frame is here 2 Mb.

Example 2 further shows that the set of parameters that should be taken as reference for computing the target frame size is not the one including the lowest network capacity B. It also shows that the invention allows to appropriately decide on the target frame size even in case of a wide range of parameters of different values between the plurality of sets.

The invention claimed is:

1. A method of encoding a video frame to be transmitted to first and second clients over first and second network connections, the first and second network connections having associated at least first and second parameters wherein the first parameter is representative of the network connection bandwidth and the second parameter is distinct from the first parameter, the method comprising:
    obtaining at least a value of the first parameter and a value of the second parameter of the first network connection;
    obtaining at least a value of the first parameter and a value of the second parameter of the second network connection, wherein the value of at least one parameter differs between the first and second network connections;
    for the first network connection, determining a frame size that can be transported over the first network connection considering at least the obtained values of the first and second parameters of the first network connection;
    for the second network connection, determining a second frame size that can be transported over the second network connection considering at least the obtained values of the first and second parameters of the second network connection;
    determining a target frame size based on the minimum of the determined first and second frame sizes; and
    compressing the video frame to the determined target frame size.

2. Method according to claim 1, wherein each determined frame size is the maximum acceptable frame size that can be transported over the corresponding connection.

3. Method according to claim 1, wherein the frame size for a connection is determined in dependence upon a measure of bandwidth of the connection concerned and a transmission buffer filling level.

4. Method according to claim 3, wherein the buffer filling level at the start and end of transmission of a group of pictures is taken into account in the determination.

5. Method according to claim 1, wherein the frame size for a connection is determined in dependence upon a measure of end-to-end transmission time of the connection and a maximum acceptable delay between an operation on the frame prior to transmission and an operation on the frame following reception by a client.

6. A non-transitory computer readable storage medium storing a program executable by a data-processing system to encode a video frame to be transmitted to first and second clients over first and second network connections, the first and second network connections having associated at least first and second parameters wherein the first parameter is representative of the network connection bandwidth and the second parameter is distinct from the first parameter, the program when executed causing the data-processing system to:
    obtain at least a value of the first parameter and a value of the second parameter of the first network connection;
    obtain at least a value of the first parameter and a value of the second parameter of the second network connection, wherein the value of at least one parameter differs between the first and second network connections;
    determine, for the first network connection, a frame size that can be transported over the first network connection considering at least the obtained values of the first and second parameters of the first network connection;
    determine, for the second network connection, a second frame size that can be transported over the second network connection considering at least the obtained values of the first and second parameters of the second network connection;
    determine a target frame size based on the minimum of the determined first and second frame sizes; and
    compress the video frame to the determined target frame size.

7. A server for encoding a video frame to be transmitted to first and second clients over first and second network connections, the first and second network connections having associated at least first and second parameters wherein the first parameter is representative of the network connection bandwidth and the second parameter is distinct from the first parameter, the server comprising:
    a first obtaining unit which obtains at least a value of the first parameter and a value of the second parameter of the first network connection;
    a second obtaining unit which obtains at least a value of the first parameter and a value of the second parameter of the second network connection, wherein the value of at least one parameter differs between the first and second network connections;
a first determining unit which determines, for the first network connection, a frame size that can be transported over the first network connection at least the obtained values of the first and second parameters of the first network connection;
a second determining unit which determines, for the second network connection, a second frame size that can be transported over the second network connection considering at least the obtained values of the first and second parameters of the second network connection;
a third determining unit which determines a target frame size based on the minimum of the determined first and second frame sizes; and
an encoder which compresses the video frame to the determined target frame size.

* * * * *